US008212801B2

(12) United States Patent
Miyazawa et al.

(10) Patent No.: US 8,212,801 B2
(45) Date of Patent: Jul. 3, 2012

(54) BOOSTER CIRCUIT AND DISPLAY DEVICE

(75) Inventors: Toshio Miyazawa, Chiba (JP); Katsumi Matsumoto, Mobara (JP); Norio Mamba, Kawasaki (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1056 days.

(21) Appl. No.: 11/491,248

(22) Filed: Jul. 24, 2006

(65) Prior Publication Data
US 2007/0018935 A1    Jan. 25, 2007

(30) Foreign Application Priority Data
Jul. 25, 2005   (JP) .................. 2005-213607

(51) Int. Cl.
*G06F 3/038* (2006.01)
*G09G 5/00* (2006.01)

(52) U.S. Cl. .............. 345/211; 345/212; 345/213
(58) Field of Classification Search .......... 345/98, 345/211–213, 99–100, 94; 315/169.1–169.3
See application file for complete search history.

(56) References Cited

U.S. PATENT DOCUMENTS

| | | | |
|---|---|---|---|
| 5,644,534 A * | 7/1997 | Soejima ............ | 365/185.23 |
| 6,459,330 B2 * | 10/2002 | Yasue ............... | 327/538 |
| 6,909,413 B2 | 6/2005 | Nanno et al. | |
| 7,148,886 B2 | 12/2006 | Nakajima | |
| 2004/0160436 A1 * | 8/2004 | Tanaka ............. | 345/211 |

FOREIGN PATENT DOCUMENTS

| | | |
|---|---|---|
| JP | 07-087400 | 3/1995 |
| JP | 2001-100177 | 4/2001 |
| JP | 2001-1574437 | 6/2001 |
| JP | 2002-175027 | 6/2002 |
| JP | 2002-251160 | 9/2002 |

\* cited by examiner

*Primary Examiner* — Sumati Lefkowitz
*Assistant Examiner* — Jonathan Horner
(74) *Attorney, Agent, or Firm* — Antonelli, Terry, Stout & Kraus, LLP.

(57) ABSTRACT

The present invention provides a display device which is used in a miniaturized portable information device, wherein the display device requires a small mounting area for a driving circuit thus realizing free mounting of the driving circuit and also can perform driving thereof with a low-voltage power source such as a battery. In a display device which includes a display panel and a driving circuit on the same substrate, a booster circuit is formed on one side of a display panel together with the driving circuit and is formed by steps substantially equal to steps for pixel transistors. The booster circuit includes a circuit which compensates for the lowering of voltage of a switching element used in the booster circuit attributed to a threshold value of a switching element.

5 Claims, 10 Drawing Sheets

BOOSTER CIRCUIT AND DISPLAY DEVICE

BACKGROUND OF THE INVENTION

Field of the invention

The present invention relates to a display device, and more particularly to a display device having a driving circuit and a voltage booster of a display device used for a portable device.

A liquid crystal display device of a TFT (Thin Film Transistor)type includes a switching element in each pixel portion. The TFT type display device has been popularly used as a display device of a personal computer or the like. Further, the TFT type display device has been also used as a display device of a portable information device such as a mobile phone. The display device which is used in the portable information device is required to satisfy the further miniaturization and the lower power consumption performance compared to a conventional liquid crystal display device.

The miniaturization involves a drawback. The reduction of a space for mounting a driving circuit of the display device arises according with the miniaturization. In general, with respect to an appearance of the display device, the display device having a narrow peripheral portion of a display region (narrow picture frame) has the preference. However, the peripheral portion of the display region is a region which is used for mounting the driving circuit. Accordingly, due to a demand for the narrow picture frame, the driving circuit is further miniaturized and the mounting area is narrowly restricted. Further, the display device which exhibits the high resolution has been developed, and along with the increase of the number of outputs from the driving circuit, a pitch between connection terminals is further narrowed thus giving rise to a drawback that the connection reliability is lowered.

Accordingly, to realize the driving circuit with the smaller area and to overcome the drawback attributed to the connection, there has been developed and practically used a so-called driving-circuit-integrated display device which fabricates a driving circuit on the same substrate on which switching elements are mounted in the substantially same steps for manufacturing the switching elements of the pixel portions.

On the other hand, the display device of the portable information device is required to satisfy the low power consumption. Further, the display device of the portable information device is required to be driven with a power source which is portable such as a battery. However, in driving the display device, versatile voltages are necessary and hence, when a power source of a single voltage is used at a low voltage of the battery, it is necessary to form voltages for driving the display device from the power source voltage by using a booster circuit or the like.

The booster circuit is disclosed in Japanese Patent Laid-open Hei7 (1995)-87400. However, the booster circuit disclosed in the Japanese Patent Laid-open Hei7 (1995)-87400 is provided on the premise that the booster circuit is formed on a semiconductor substrate, and there is no disclosure with respect to a booster circuit which is formed on an insulating substrate using thin film transistors.

SUMMARY OF THE INVENTION

In the driving-circuit-integrated display device, the driving circuit is formed in the same step for forming switching elements of the pixel portions, and the booster circuit is also required to be formed on the substrate on which the pixel portions are formed. The switching element of the pixel portion uses a semiconductor layer which is formed by stacking and hence, the switching element possesses a high threshold value compared to transistors or the like which are formed on the semiconductor substrate thus giving rise to various drawbacks such as irregularities of the threshold value.

The present invention has been made to overcome the drawbacks which have been found out in the course of the realization of a booster circuit using a switching element having the above-mentioned drawbacks and it is an object of the present invention to provide a technique which can realize an optimum booster circuit in a miniaturized display device.

The above-mentioned object, other objects and novel features of the present invention will become apparent from the description of the specification and attached drawings.

To briefly explain typical inventions among the inventions disclosed in this specification, they are as follows.

A display device comprises a pixel electrodes, switching elements which supply video signals to the pixel electrodes, a driving circuit which supplies the video signals to the switching elements, a driving circuit which outputs scanning signals, and a booster circuit on a same substrate.

A booster circuit includes a control terminal of the switching element. A voltage that can ignore the voltage reduction with a threshold voltage is supplied to the control terminal.

Since the built-in booster circuit which is not influenced by the threshold value can be realized, a desired boosted voltage is obtainable irrespective of the threshold value. Further, it is possible to form the booster circuit using the simple channel structure and hence, a peripheral circuit can be eliminated.

A display device comprises a pixel electrodes, switching elements which supply video signals to the pixel electrodes, a driving circuit which supplies the video signals to the switching elements, a driving circuit which outputs scanning signals, and a booster circuit on a same substrate.

The booster circuit includes a plurality of boosted capacitors for holding the voltage which is boosted in response to a boosting pulse, a voltage which is formed to be higher than a voltage held by the boosted capacitor by an amount corresponding to the threshold value voltage is supplied to the control terminal of the transmission switching element in a diode connection mode which is provided between the boosted capacitors, and a boosted voltage which is boosted to the boosted capacitor of a next stage is transmitted while ignoring the lowering of voltage attributed to a threshold value voltage of the switching element.

DETAIL DESCRIPTION OF THE PREFERRED EMBODIMENTS

Embodiments of the present invention are explained in detail in conjunction with drawings hereinafter. Here, in all drawings for explaining the embodiments, parts having identical functions are given same numerals and their repeated explanation is omitted.

Figure 1:
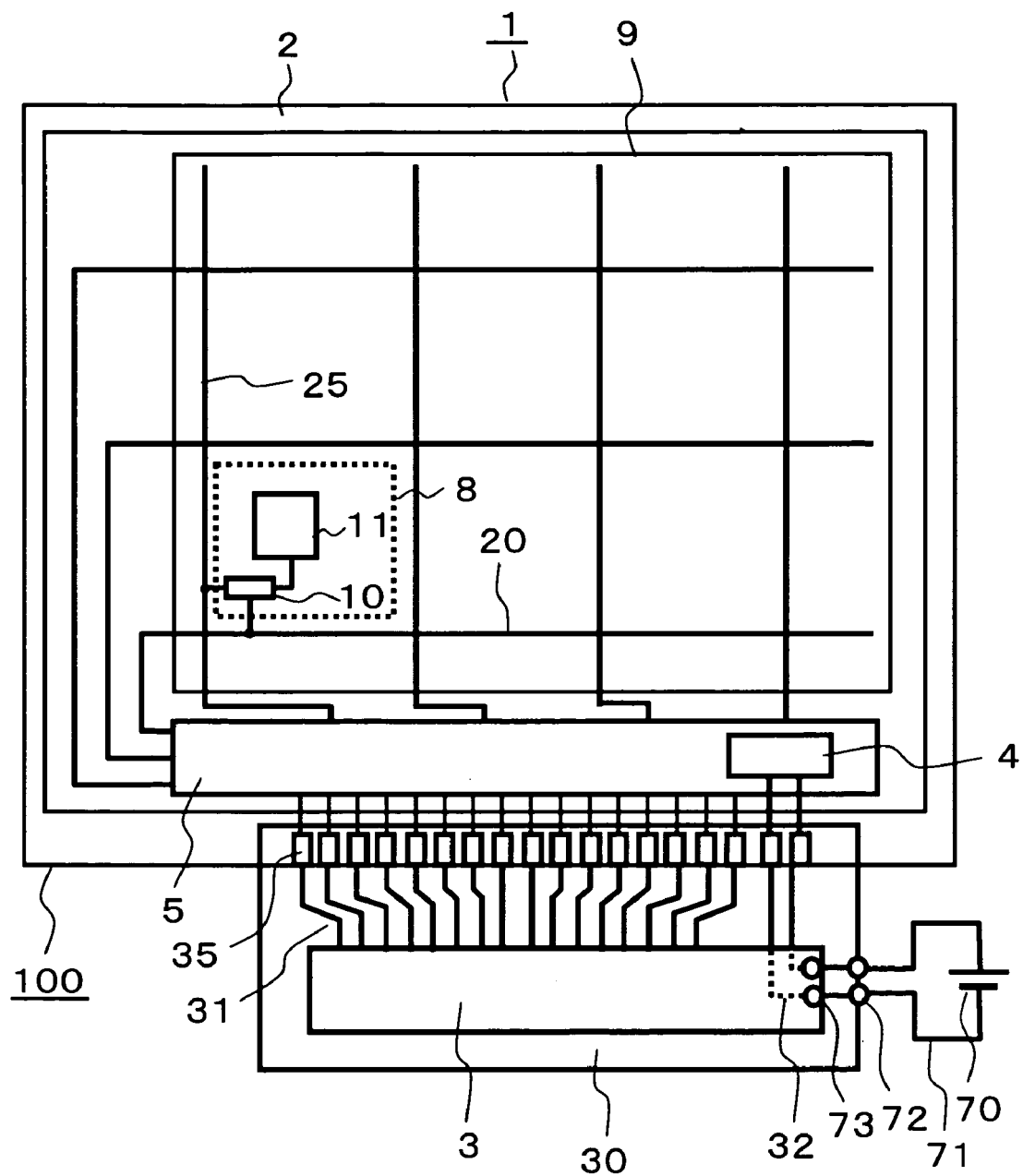
FIG. 1 is a schematic block diagram showing a display device of an embodiment of the present invention.

FIG. 1 is a block diagram showing the basic constitution of a display device of the present invention. As shown in the drawing, the display device 100 is constituted of a display panel 1 and a control circuit 3.

The display panel 1 includes an element substrate 2. The element substrate 2 is made of insulating substrate like a transparent glass, plastic or the like, or of a semiconductor substrate. On the element substrate 2, pixels 8 are arranged in a matrix array thus forming a display region 9. (In FIG. 1, only one pixel being described and other pixels being omitted so as to avoid the drawing from becoming complicated.) The pixel 8 includes a pixel electrode 11 and a switching element 10.

On a periphery of the display region 9, a driving circuit part 5 is formed along an edge of the element substrate 2. The driving circuit part 5 is formed on the element substrate 2 by steps substantially equal to steps for forming switching elements 10.

Scanning signal lines 20 extend to the display region from the driving circuit part 5, and the scanning signal lines 20 are electrically connected with control terminals of the switching elements 10. Here, the driving circuit part 5 outputs a control signal (also referred to as a scanning signal) which turns on or off the switching elements 10 to the scanning signal lines 20.

In addition, video signal lines 25 extend to the display region 9 from the driving circuit part 5 and are connected to input terminals of the switching elements 10. The video signal is outputted to the video signal lines 25 from the driving circuit part 5, and the video signal is written in the pixel electrodes 11 via the switching elements 10 which turn to an ON state by the scanning signal.

The driving circuit part 5 includes a booster circuit 4 and the booster circuit 4 generates a power source voltage necessary for driving a display panel 1 and supplies the power source voltage to respective circuits and the like. The detail of the booster circuit 4 is described later. The booster circuit 4 is formed in the same manner as the driving circuit part 5, wherein the booster circuit 4 is formed using steps substantially equal to steps for forming the switching elements 10 of pixels 8 on the element substrate 2.

A flexible printed circuit board 30 is connected to the display panel 1, and the control circuit 3 is mounted on the flexible printed circuit board 30. The control circuit 3 has a function of controlling a driving circuit which is provided in the driving circuit part 5 and supplies the control signal, the video signal and the like to the display panel 1 via the flexible printed circuit board 30.

As a power source for the display device 100, a battery 70 is connected to the flexible printed circuit board 30 by way of a battery line 71 and a battery terminal 72. Here, the battery 70 is not necessarily a power source which is exclusively used by the display device 100 and the display device 100 may use a power source of the portable device on which the display device 100 is mounted.

Display lines 31 and a power source line 32 are formed on the flexible printed circuit board 30 and are electrically connected with the display panel 1 via input terminals 35. Signals which control the display panel 1 are supplied through the display lines 31. The power source line 32 is connected between the battery terminal 72 and power source terminals 73 of the control circuit 3 and the power source lines 32 is arranged on the flexible printed circuit board 30 and is electrically connected with the booster circuit 4 via the input terminal 35.

Recently, there has been proposed a method called COG (Chip on Glass), wherein some parts on a flexible printed circuit board, particularly, a semiconductors IC are directly connected to a glass substrate. The display device of this embodiment may also adopt this COG method.

Figure 2:
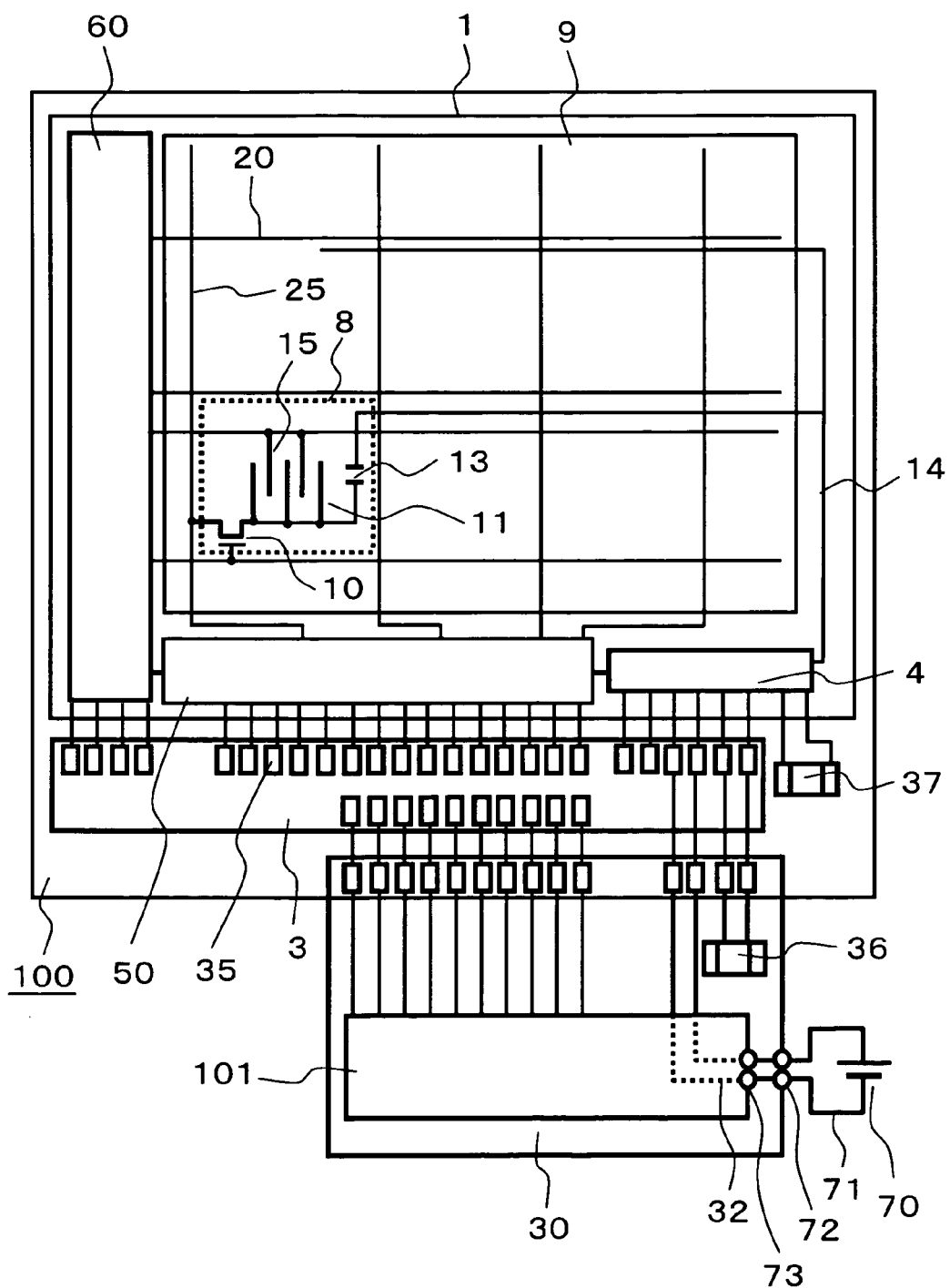
FIG. 2 is a schematic block diagram showing a liquid crystal display device of the embodiment of the present invention.

Next, FIG. 2 is a block diagram showing the basic structure of the liquid crystal display device of this embodiment according to the present invention. As shown in the drawing, the liquid crystal display device 100 includes the liquid crystal display panel 1 and the control circuit 3. Further, to the liquid crystal display device 100, a main device 101 is connected via the flexible printed circuit board 30. The liquid crystal display device 100 is used as a display part of the main device 101. The main device 101 uses a battery 70 as a power source thereof and a power source voltage is supplied to the liquid crystal display device 100 from the main device 101 through the lines 32.

The liquid crystal display panel 1 includes an element substrate 2 which is formed of an insulating substrate made of a transparent glass, or an insulating substrate made of a transparent glass, plastic or the like, or a semiconductor substrate and a counter substrate (not shown in the drawing). The element substrate 2 and the counter substrate are overlapped to each other with a predetermined gap therebetween and both substrates are adhered to each other using a frame-like sealing material which is arranged between peripheral portions of both substrates. From a liquid crystal filling port formed in a portion of the sealing material, liquid crystal is filled and sealed in the inside of the sealing material between both substrates. Then, polarizers are adhered to outer sides of both substrates thus constituting the liquid crystal display panel.

On the element substrate 2, pixels 8 are arranged in a matrix array so as to form a display region 9. Each pixel 8 includes a pixel electrode 11 and a thin film transistor 10 which constitutes a switching element. Each pixel is provided corresponding to a portion where a plurality of scanning signal lines (or gate signal lines) 20 and a plurality of video signal lines (or drain signal lines) 25 intersect each other.

The thin film transistor 10 of each pixel has a source thereof connected to the pixel electrode 11, a drain thereof connected to the video signal line 25 and a gate thereof connected to the scanning signal line 20. The thin film transistor 10 functions as a switch for supplying a display voltage (a gray scale voltage) to the pixel electrode 11.

Here, source and drain may be called reversely depending on the bias relationship therebetween. However, in this specification, the electrode which is connected to the video signal line 25 is referred to as the drain.

Further, FIG. 2 shows a so-called In-plane Switching type liquid crystal display panel in which the counter electrode 15 is mounted on the element substrate 2. However, this embodiment is applicable to a so-called vertical electric field type liquid crystal display panel in which the counter electrode 15 is mounted on a counter substrate.

The booster circuit 4, a video signal circuit 50 and a scanning signal circuit 60 are respectively formed on the element substrate 2 which is a transparent insulating substrate (a glass substrate, a resin-made substrate or the like). Further, the controller 3 is formed of an IC chip and is directly mounted on the liquid crystal display panel 1. A digital signal (display data, a clock signal, a control signal and the like) which is transmitted from the controller 3 is inputted to the booster circuit 4, the video signal circuit 50 and the scanning signal circuit 60 via the input terminals 35.

The controller 3 is constituted of a semiconductor integral circuit (LSI) and controls and drives the booster circuit 4, the video signal circuit 50 and the scanning signal circuit 60 based on respective display control signals such as the clock signal, the display timing signal, the horizontal synchronizing signal and a vertical synchronizing signal and display data (R•G•B) which are transmitted from the outside.

The booster circuit 4, the video signal circuit 50 and the scanning signal circuit 60 are formed by steps substantially equal to steps for forming the thin film transistors 10. The scanning signal circuit 60 drives the scanning signal lines 20, the video signal circuit 50 drives the video signal lines 25 and the booster circuit 4 generates and supplies voltages necessary for driving respective circuits. Numerals 36, 37 indicate externally mounted capacitor elements, wherein the capacitor element 36 is mounted on the flexible printed circuit board 30. On the other hand, the capacitor element 37 is connected and mounted on the liquid crystal display panel 1 via a terminal which is mounted on the liquid crystal display panel 1.

The scanning signal circuit 60 sequentially supplies a High-level selective scanning voltage (a scanning signal) to the respective scanning signal lines 20 of the liquid crystal display panel 1 based on a frame start instruction signal (FLM, also referred to as a start signal hereinafter) and a shift clock (CL1) transmitted from the controller 3 for every 1 horizontal scanning time. Accordingly, a plurality of thin film transistors 10 connected to each scanning signal line 20 of the liquid crystal display panel 1 hold an ON state for 1 horizontal scanning time.

Further, the video signal circuit 50 outputs gray scale voltages corresponding to gray scales to be displayed by the pixels to the video signal lines 25. When the thin film transistor 10 turns to an ON state, the gray scale voltage (the video signal) is supplied to the pixel electrode 11 from a video signal line 25. Thereafter, when the thin film transistor 10 is turned off, the gray scale voltage based on an image to be displayed by the pixel is held in the pixel electrode 11.

Next, the booster circuit 4 which is used in the power source circuit is explained. In a miniaturized portable information device such as a mobile phone, a battery is generally used as a power source. Further, a battery having an output voltage of approximately 1.3V to 3V is used in view of the quantity of distribution of the battery on market. Accordingly, here arises a necessity to form power source voltages necessary for the liquid crystal display device by using the booster circuit 4.

Figure 3:
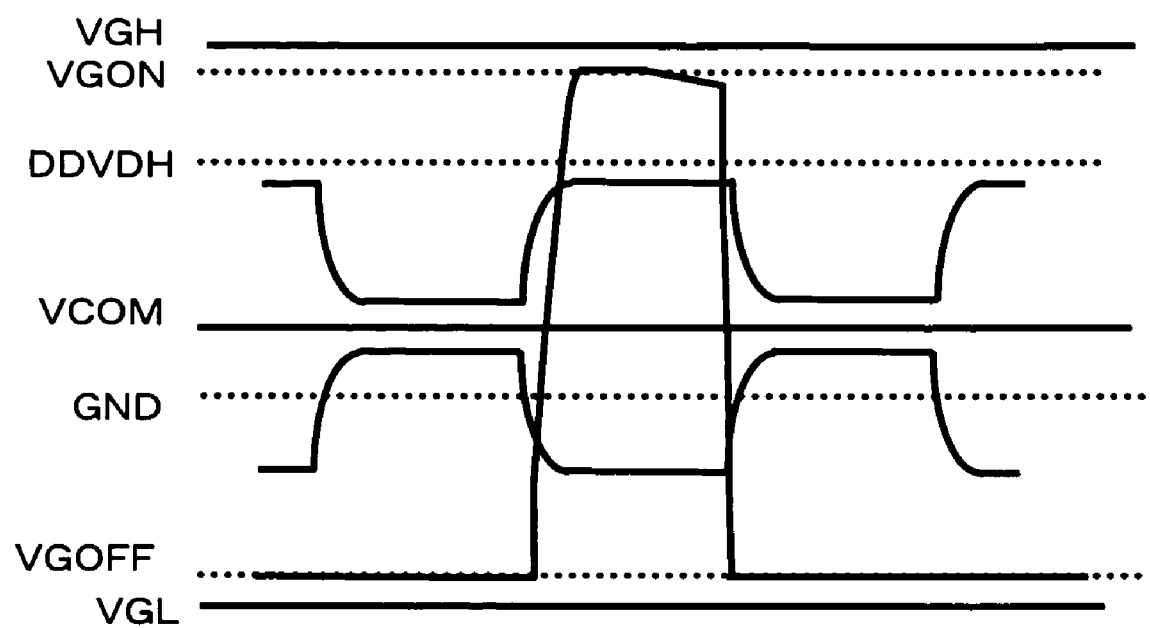
FIG. 3 is a schematic waveform chart showing drive signals used in the liquid crystal display device of the embodiment of the present invention.

FIG. 3 shows respective signals and power source voltages which are necessary for forming the signals in the thin-film-transistor-type liquid crystal display device. In FIG. 3, symbol VGON indicates a High voltage of the scanning signal for turning on the thin film transistor (TFT). A voltage of approximately 7V to 15V is necessary as the voltage VGON. Symbol VGOFF indicates a Low voltage of a scanning signal for turning off the thin film transistor (TFT). A voltage of approximately −2V to −5V is necessary as the voltage VGOFF. Symbol DDVDH indicates a power source voltage for the video signal circuit 50 and the scanning signal circuit 60 shown in FIG. 2. Values of these voltages are determined based on maximum rated values of respective circuits 5.

Among the above-mentioned power sources necessary for the liquid crystal display device, a High voltage VGH for scanning signal circuit and a Low power source VGL for scanning signal circuit are formed using a charging-pump-type booster circuit and other voltages are formed by dividing a voltage which is formed by the booster circuit or the like.

Figure 4:
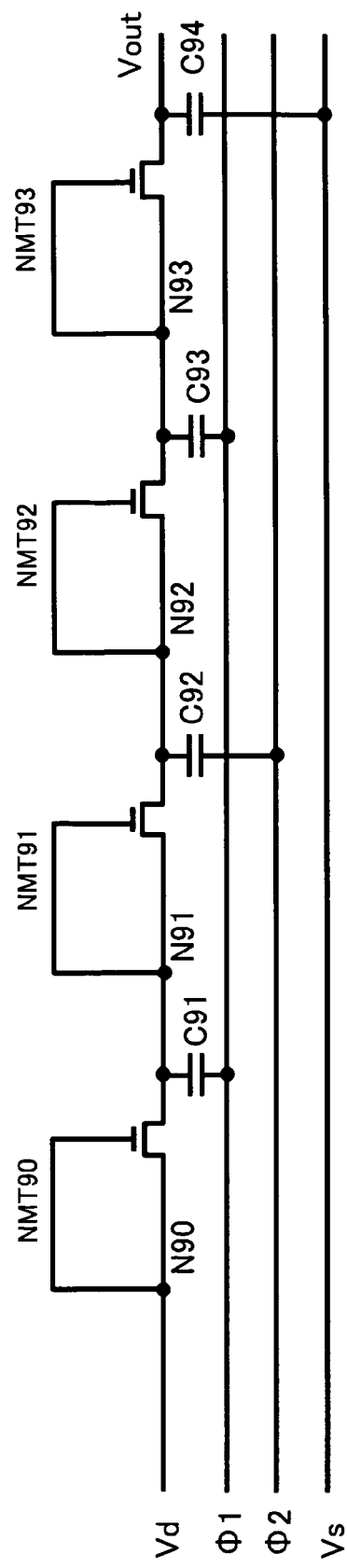
FIG. 4 is a schematic circuit diagram showing a booster circuit of the embodiment of the present invention.
Figure 5:
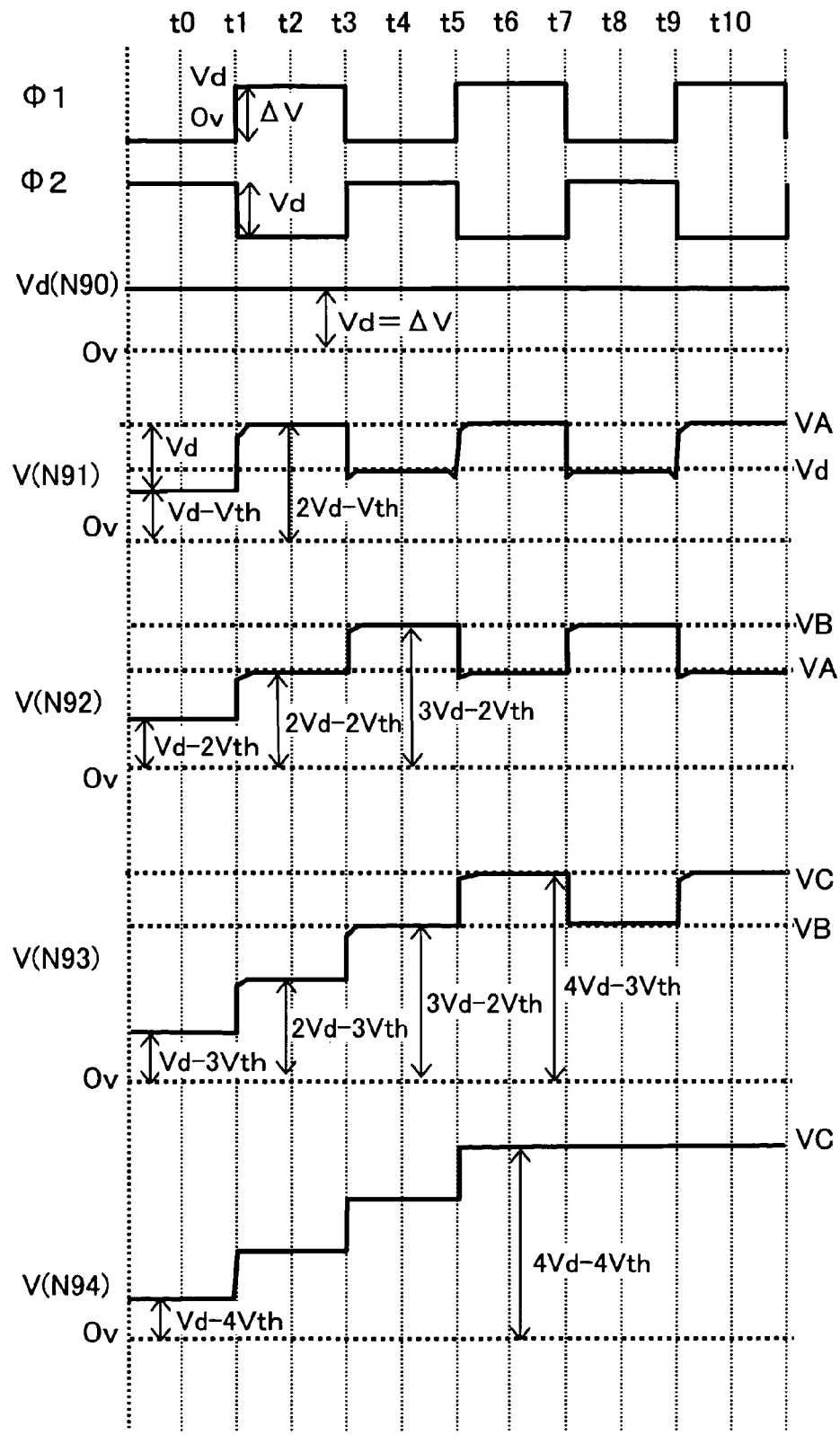
FIG. 5 is a schematic waveform chart showing a driving method of the booster circuit of the embodiment of the present invention.

Next, an operational principle of the charging-pump-type booster circuit is explained in conjunction with FIG. 4 and FIG. 5. The booster circuit is constituted of an input power source Vd, booster capacitors C91, C92, C93, an output capacitor C94, and transistors NMT90, NMT91, NMT92, NMT93 in a diode connection.

The charging pump circuit in FIG. 4 uses boosting pulses Φ1 and Φ2 which are not overlapped (non-overlap) to each other. The boosting pulses Φ1 and Φ2 have, as shown in FIG. 5, a voltage Vs at a low-level side and a voltage Vd at a high-level side. The boosting pulses Φ1 and Φ2 as well as boosting pulses Φ3 and Φ4 described later are supplied from the above-mentioned controller 3.

The voltage Vd is supplied to node N90 from the outside. Transistors NMT90 to NMT93 are connected in a diode connection and turned ON state. In an ideal case in which threshold values of respective transistors are so small with respect to the voltage Vd that the threshold values can be ignored, the nodes N91 to N93 applied the voltage Vd. Here, when the boosting pulse Φ1 assumes the High level, the voltage of the node N91 which is connected to the boosting capacitor C90 is boosted. The high level of the boosting pulse Φ1 assumes the voltage Vd and hence, the voltage of the node N91 ideally becomes 2Vd which is twice as larger as the voltage Vd. In the same manner, the voltage of the node N93 is also boosted to the voltage 2Vd in response to the boosting pulse Φ1.

Next, when the boosting pulse Φ1 assumes the low level and the boosting pulse Φ2 assumes the high level, the voltage of the node N92 which is connected with the boosted capacitor C91 is boosted. Since the high level of the boosting pulse Φ2 assumes the voltage Vd, the node N92 assumes a voltage 3Vd.

Next, when the boosting pulse Φ2 assumes a low level and the boosting pulse Φ1 assumes a high level, the voltage of the node N93 which is connected to the boosting capacitor C93 is elevated to assume a voltage 4Vd.

Hereinafter, by repeating the substantially equal operation, the boosted voltage which is approximately four times as large as the difference ΔV between the high level and the low level of the boosting pulse is stored in the boosting capacitor C94. However, in an actual operation, the voltage is lowered from the transistor NMT 90 which is in a diode connection by an amount corresponding to the threshold value voltage of the transistor NMT 93.

Although a charging-pump circuit shown in FIG. 4 may form the boosted voltage with the simple constitution, there exists a drawback that the voltage is lowered by the amount corresponding to the threshold value voltage. Particularly in the display device, when a transistor which is used in the charging-pump circuit is formed on the same substrate using the same steps as the thin film transistor of the pixel portion, the lowering of voltage attributed to this threshold value becomes apparent and the efficiency is decreased more. Further, the threshold value is not constant among the respective transistors and it is difficult to obtain the desired boosted voltage. Particularly, in producing the transistors on a mass production basis, it is found that the voltage after boosting becomes irregular for respective display panels and hence, the satisfying reliability cannot be obtained.

Figure 6:
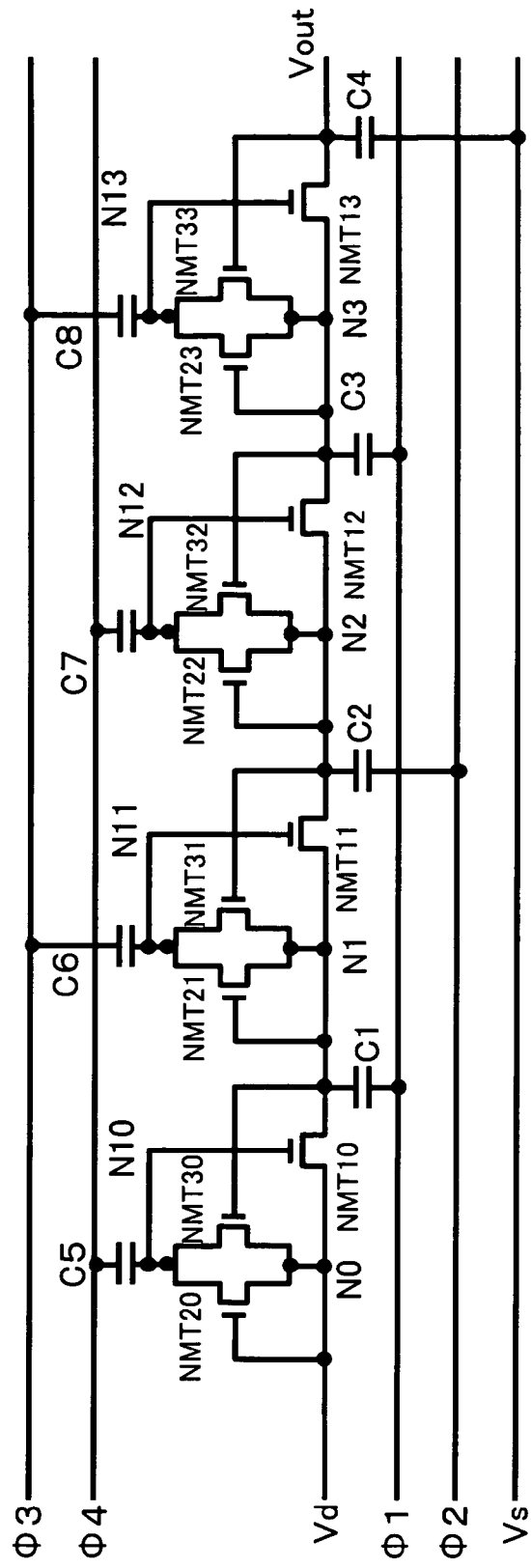
FIG. 6 is a schematic circuit diagram showing a booster circuit of the embodiment of the present invention.
Figure 7:
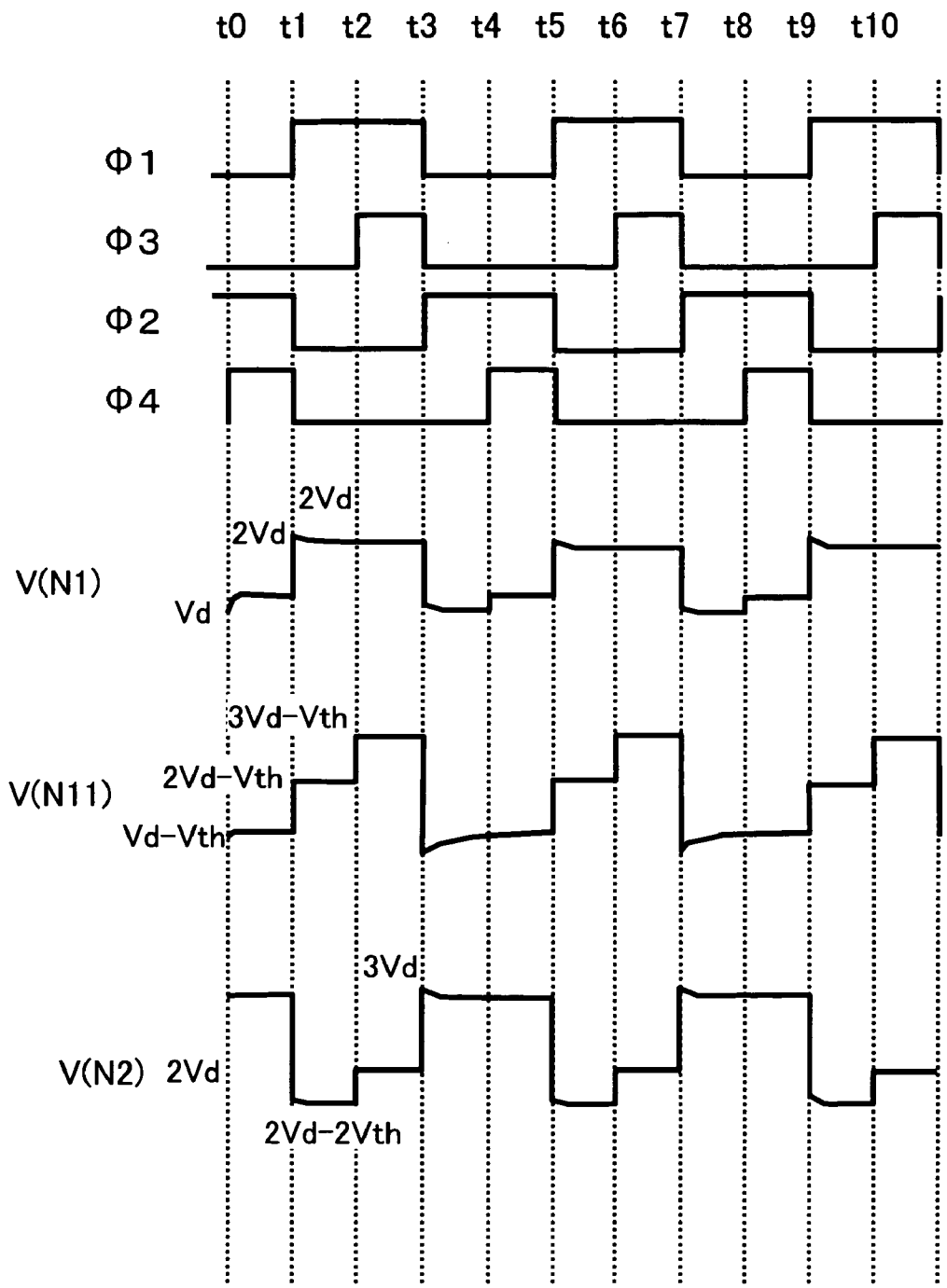
FIG. 7 is a schematic waveform chart showing a driving method of the booster circuit of the embodiment of the present invention.

Next, the charging pump circuit which reduces the lowering of the voltage attributed to the threshold value is explained in conjunction with FIG. 6 and FIG. 7.

In FIG. 6, the capacitor elements C1, C2, C3 are booster capacitances, wherein one electrodes of the capacitor elements C1 and C3 are connected to the signal line which supplies the boosting pulse Φ1. On the other hand, one electrode of the capacitor element C2 is connected with the signal line which supplies the boosting pulse Φ2. The capacitor element C4 has one electrode thereof connected with the reference voltage Vs and forms the output capacitor which holds the boosted voltage.

Transistors NMT10, NMT11, NMT12, NMT13 are switching elements which are electrically connected between the boosted capacitors. To the control terminals of the transistors NMT10 to 13, capacitor elements C5, C6, C7, C8 are connected.

A voltage Vd is supplied to a node N0 in the drawing. The voltage Vd is boosted by the boosting pulse Φ1 and the boosting pulse Φ2 via the transistors NMT 10 to 13 and the booster capacitors C1 to C3. The boosted voltage is held in the output capacitor C4 and is utilized as a power source voltage.

As described above, to the control terminals of the transistors NMT10 to NMT13, the capacitor elements C5, C6, C7, C8 are connected. Transistors NMT20, NMT21, NMT22, NMT23 which are connected in a diode connection are provided between the boosting capacitor of a preceding stage and the control terminals of the respective transistors NMT10 to NMT13. The voltages of the respective booster capacitors are applied to the control terminals of the transistors NMT10 to NMT13.

Further, between the control terminals of the transistors NMT10 to NMT13 and the boosting capacitor of the preceding stage, the transistors NMT30, NMT31, NMT32, NMT33 are provided. Charges which are held in the control terminals of the transistors NMT10 to 13 are configured to be discharged to the boosting capacitor of the preceding stage.

Next, the manner of operation of the circuit shown in FIG. 6 is explained in conjunction with FIG. 7. In FIG. 7, the boosting pulses Φ1, Φ2, Φ3, Φ4 and the voltages of nodes N1, N11, N2 are shown. Further, in FIG. 7, the explanation is made with respect to an operation in which the voltage is held by the boosting capacitor C2 out of the respective boosting operations. The voltage which is boosted and held in the boosting capacitor C1 is held in the boosting capacitor C2 via the transistor NMT11. Here, to facilitate the understanding, the explanation is made by setting the reference voltage Vs (low level of the boosting pulse) as 0V.

First of all, when the boosting pulse Φ1 is changed to a high level at a point of time t1, the voltage VN1 of the node N1 is elevated via the boosting capacitor C1. When the voltage VN1 of the node N1 is elevated and assumes a value higher than a threshold value voltage of an n-type transistor NMT21 in a diode connection, a voltage V(N11) of a node N11 is elevated via the transistor NMT21.

Assuming the voltage held at the node N1 at a point of time t1 as Vd, a high level of the boosting pulse Φ1 as the voltage Vd and a low level of the boosting pulse Φ1 as the voltage 0V, the voltage of the node N1 is boosted from the voltage Vd to the voltage 2Vd due to the boosting pulse Φ1.

Further, assuming the threshold value of the transistor NMT21 as the voltage Vth, the voltage of the node N11 becomes 2Vd−Vth. Since the voltage 2Vd−Vth is applied to the control terminal (gate) of the transistor NMT11, the transistor NMT11 assumes an ON state, a charge flows in the node N2 from the node N1, and voltages of the node N1 and the node N2 become equal to each other. Assuming the threshold value as Vth, this operation continues until the voltage of the node N2 becomes 2Vd−2Vth.

Next, when the pulse Φ3 assumes a high level at a point of time t2, the voltage of the node N11 is elevated via the capacitor element C6. Assuming a high level of the pulse Φ3 as the voltage Vd and a low level of the pulse Φ3 as the voltage 0V, the voltage of the node N11 becomes 3Vd−Vth. When the voltage of the node N11 is equal to or more than 2Vd+Vth which is obtained by adding the threshold value voltage Vth of the transistor NMT11 to the voltage 2Vd of the node N1, the voltage of the node N2 is eventually elevated to the voltage 2Vd which is a voltage equal to the voltage of the node N1.

According to the above-mentioned operation, the charge is movable from the node N1 to the node N2 after the influence of the threshold value voltage of the transistor NMT11 on the lowering of voltage is decreased to an extent that the influence can be ignored.

Next, at a point of time t3, the boosting pulse Φ1 and the boosting pulse Φ3 assume the low level and the boosting pulse Φ2 assumes the high level. When the voltage V(N2) of the node N2 assumes a value higher than the voltage V(N1) of the node N1 by an amount corresponding to the threshold value voltage Vth of the transistor NMT31, the transistor NMT31 assumes an ON state. The charge of the node N11 is discharged to the node N1 so that the voltage of the node N1 and the voltage of the node N11 become equal to each other and hence, the transistor NMT11 assumes an OFF state. When the transistor NMT11 assumes the OFF state, a backward flow of the charge from the node N2 to the node N1 can be prevented.

By applying the voltage which is higher than the boosted voltage to be transmitted by an amount corresponding to the threshold value voltage to the control terminal of the transistor NMT11, it is possible to reduce the influence of the threshold value voltage to the lowering of voltage to an extent that the influence can be ignored. Further, due to the provision of the transistor NMT31, it is possible to overcome a new drawback that the charge is held at the control terminal of the transistor NMT11 and hence, the transistor NMT11 does not assume the sufficient OFF state and the booster voltage backflows.

Hereinafter, in the same manner, the lowering of the voltage attributed to the threshold values of the respective transistors NMT10 to 13 can be ignored. When the parasitic capacitance is small enough to be ignored with respect to the respective capacitor elements, the voltage 2Vd is held at the node N1, the voltage 3Vd is held at the node N2, and the voltage 4Vd is held at the node N3, and the voltage 4Vd can be held in the output capacitor C4 when there is no load.

Next, a circuit which generates the voltage of negative polarity is explained. Here, in case of the voltage of negative polarity, although the term "boosting" is not proper in an accurate use of the term, a circuit of a charging-pump method which forms the voltage using capacitor is generally referred to as a booster circuit. As shown in FIG. 3, in the liquid crystal display device, there may be a case in which the voltage of negative polarity is used as the low voltage of the scanning signal for turning off the thin film transistor (TFT) and hence, the booster circuit is also required to form the voltage of negative polarity.

Figure 8:
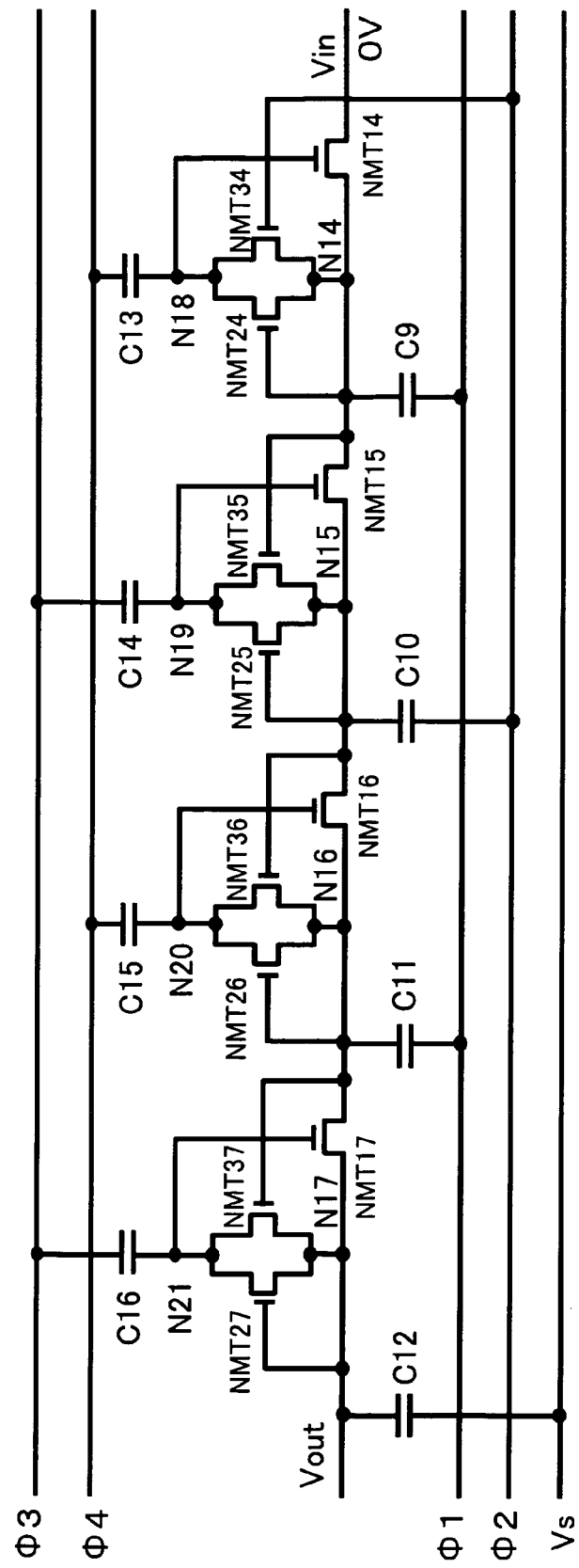
FIG. 8 is a schematic circuit diagram showing a booster circuit of the embodiment of the present invention.

A circuit shown in FIG. 8 is a charging-pump circuit of negative polarity which reduces the lowering of the voltage attributed to the threshold value.

In FIG. 8, capacitor elements C9, C10, C11 are booster (dropping) capacitors, wherein one electrodes of the capacitor elements C9 and C11 are connected with the signal line which supplies the boosting pulse Φ1. On the other hand, one electrode of the capacitor element C10 is connected with the signal line which supplies the boosting pulse Φ2. Further, one electrode of the capacitor element C12 is connected with the reference voltage Vs thus forming an output capacitor which holds the boosted voltage.

Switching elements which are electrically connected between the booster capacitors are constituted of transistors NMT14, NMT15, NMT16, NMT17. To control terminals of the transistors NMT14 to NMT17, capacitor elements C13, C14, C15, C16 are connected.

A voltage Vs (0V) is supplied to an input part Vin on the right side in the drawing, wherein the voltage Vs (0V) is dropped in response to the boosting pulses Φ1 and Φ2 due to the booster capacitors C9 to C11 via the transistors NMT14 to NMT17, and the dropped voltage is held in the output capacitor C12 and is utilized as a power source voltage.

As described above, to the control terminals of the transistors NMT14 to NMT17, the capacitor elements C13, C14, C15, C16 are connected. Then, between the boosting capacitor of a next stage and the control terminals of the respective transistors NMT14 to NMT17, transistors NMT24, NMT25, NMT26, NMT27 which are connected in a diode connection are provided. The voltages of the respective booster capacitors are applied to the control terminals of the transistors NMT14 to NMT17.

Further, between the control terminals of the transistors NMT15 to NMT17 and the boosting capacitor of the next stage, the transistors NMT35, NMT36, NMT37 are provided. The charge which is held by the control terminals of the transistors NMT14 to NMT17 can be discharged to the boosting capacitor of the preceding stage. Here, the transistor NMT34 is also connected to the control terminal of the transistor NMT14 and the charge which is held by the control terminal can be discharged to the boosting capacitor of the preceding stage. However, to turn on the transistor NMT34, the control terminal of the transistor NMT34 is connected to the boosting pulse Φ2 (substantially similar operation can be obtained by connecting the control terminal to the Vin (0V)).

Figure 9:
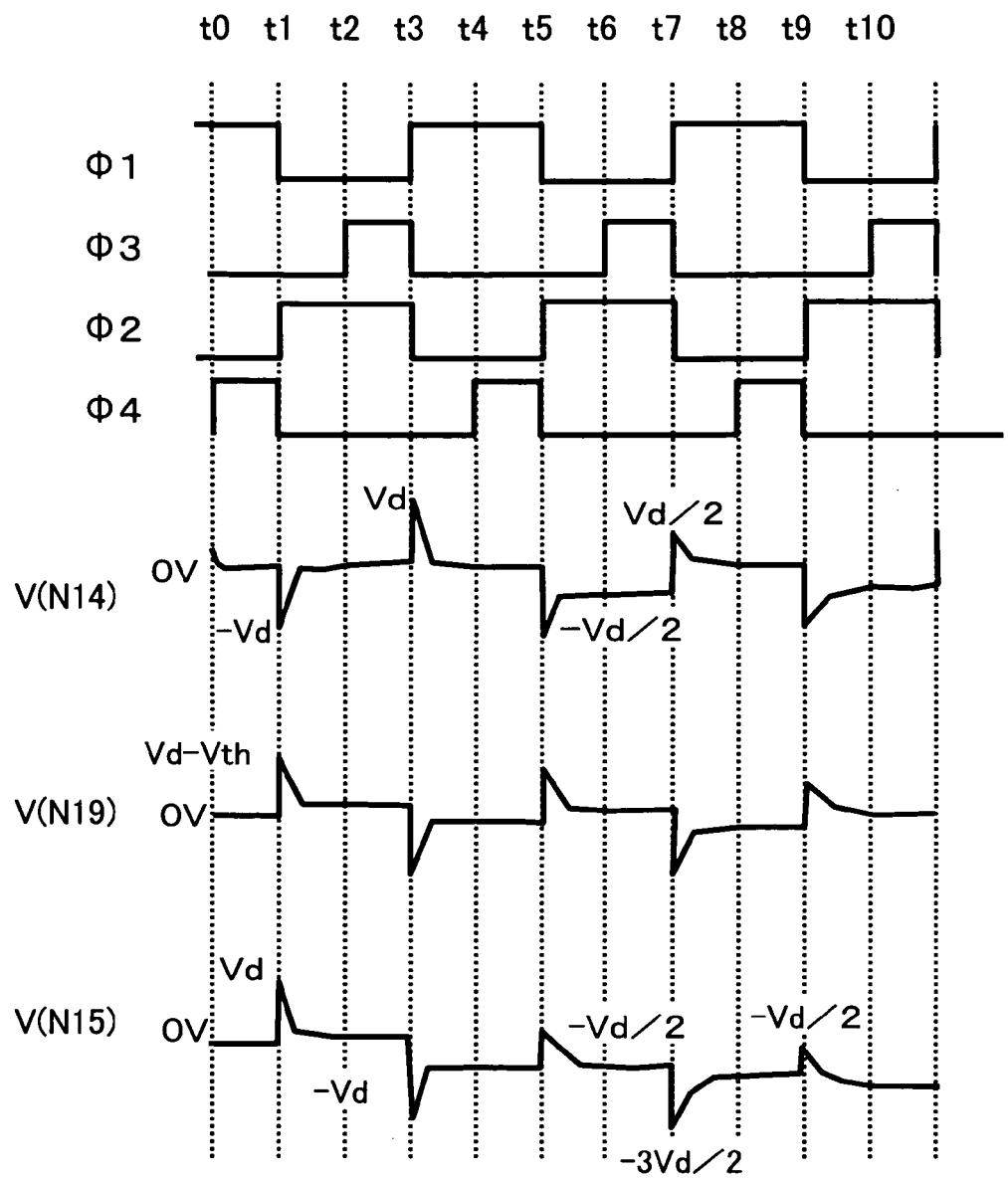
FIG. 9 is a schematic waveform chart showing a driving method of the booster circuit of the embodiment of the present invention.

Next, the manner of operation of the circuit shown in FIG. 8 is explained in conjunction with FIG. 9. In FIG. 9, the boosting pulses Φ1, Φ2, Φ3, Φ4 and the voltages of the nodes N14, N19, N15 are shown. Further, in FIG. 9, as a typical example of each voltage dropping operation, the explanation is made with respect to an operation in which the voltage which is dropped and held in the boosting capacitor C9 is held in the boosting capacitor C10 via the transistor NMT15. Here, to facilitate the understanding of the operation, the explanation is made on the premise that the reference voltage Vs (low level of the boosting pulse) is set to 0V.

By setting the voltages held at the nodes N14, N15 immediately before a point of time t1 as 0V, the low levels of the boosting pulses Φ1 to Φ4 are set to the voltage 0V and the high levels of the boosting pulses Φ1 to Φ4 are set to the voltage Vd. When the boosting pulse Φ1 is changed from Vd to 0V at the point of time t1, the voltage of the node N14 assumes −Vd (instantaneously). Since the boosting pulse Φ2 is changed from 0V to Vd simultaneously, the voltage of the node N15 assumes Vd (instantaneously). Here, the voltage of the node N19 is elevated via the transistor NMT25.

In an actual operation, the charge flows into the node N14 from the node N15 via the transistor NMT15. Accordingly, although it is not accurately assumed, for the sake of brevity, the voltage of the node N19 is assumed as Vd−Vth. When the charge flows into the node N14 from the node N15 and the relationship Vd−Vth>Vth is established, the voltages at both of the node N15 and the node N14 assume 0V.

When the boosting pulse Φ1 is changed from 0V to Vd at a point of time t3, the voltage of the node N14 assumes Vd (instantaneously). The pulse Φ2 is simultaneously changed from 0V to Vd and hence, the voltage of the node N15 assumes −Vd (instantaneously). The gate potential of the transistor NMT35 is the voltage of the node N14 and the source potential of the transistor NMT35 is the voltage of the node N15 and hence, in a process of the above-mentioned instantaneous change, when a condition that the voltage of the node N14 is more than the voltage of the node N15+Vth is satisfied, the transistor NMT35 assumes an ON state. Further, the voltage of the node N19 becomes equal to the voltage of the node N15, wherein the transistor NMT15 assumes an OFF state. Assuming that the voltage of the node N18 becomes Vd−Vth in the same manner as the above-mentioned case, the charge flows into the Vin (0V) via the transistor NMT14, while when the voltage of the node N18 becomes Vd−Vth>Vth, the voltage of the node N14 becomes 0V.

When the boosting pulse Φ1 is changed from Vd to 0V again at a point of time t5, the voltage of the node N14 assumes −Vd (instantaneously). The pulse Φ2 is simultaneously changed from 0V to Vd and hence, the voltage of the node N15 assumes 0V (instantaneously). The gate potential of the transistor NMT34 is the voltage of the pulse Φ2 and the source potential of the transistor NMT34 is the voltage of the node N14 and hence, in a process of the above-mentioned instantaneous change, when a condition that the voltage of the pulse Φ2 is more than the voltage of the node N14+Vth is satisfied, the transistor NMT34 assumes an ON state and the voltage of the node N18 becomes equal to the voltage of the node N14. Here, the transistor NMT14 assumes an OFF state. Further, assuming that the voltage of the node N19 also becomes −Vth via the transistor NMT25, the charge flows in the node N14 from the node N15, wherein provided that the relationship −Vth>−Vd+Vth is established, both of the voltage of the node N15 and the voltage of the node N14 assume −Vd/2.

When the boosting pulse Φ1 is changed from 0V to Vd at a point of time t7, the voltage of the node N14 assumes Vd/2 (instantaneously). The pulse Φ2 is simultaneously changed from 0V to Vd and hence, the voltage of the node N15 assumes −3Vd/2 (instantaneously). Assuming that the voltage of the node N18 also becomes Vd/2−Vth in the same manner as the above-mentioned case, the charge flows into the Vin (0V) via the transistor NMT14. Here, when the relationship Vd/2−Vth<Vth is established, the voltage of the node N14 assumes Vth. When the pulse Φ4 is changed from 0V to Vd at a point of time t8, the voltage of the node N18 is boosted via the capacitor element C13 and assumes Vd+Vth and hence, the transistor NMT14 again assumes an ON state and the voltage of the node N14 assumes 0V.

When the boosting pulse Φ1 is changed from 0V to Vd again at a point of time t9, the voltage of the node N14 assumes −Vd (instantaneously). The pulse Φ2 is simultaneously changed from 0V to Vd and hence, the voltage of the node N15 assumes −Vd/2 (instantaneously). The gate potential of the transistor NMT34 is the voltage of the pulse Φ2 and the source potential of the transistor NMT34 is the voltage of the node N14 and hence, in a process of the above-mentioned instantaneous change, when a condition that the voltage of the pulse Φ2 is more than the voltage of the node N14+Vth is satisfied, the transistor NMT34 assumes an ON state and the voltage of the node N18 becomes equal to the voltage of the node N14. Here, the transistor NMT14 assumes an OFF state. Further, assuming the voltage of the node N19 also assumes −Vd/2−Vth via the transistor NMT25, the charge flows into the node N14 from the node N15. Provided that the relationship −Vd/2−Vth←−Vd+Vth is established, the voltage of the node N15 assumes −Vd+2Vth, and the voltage of the node N14 assumes the −Vd/2−2Vth. When the pulse Φ3 is changed from 0V to Vd at a point of time t10, the voltage of the node N19 is boosted via the capacitor element C14 and assumes Vd/2−Vth and hence, the transistor NMT15 again assumes an ON state and both of the voltage of the node N15 and the voltage of the node N14 assume −3Vd/4. By repeating the above-mentioned operation, the voltage of the node N15 is eventually dropped to −Vd.

Assuming the voltage held at the node N14 at the point of time t1 as 0V, the low level of the boosting pulse Φ1 as the voltage 0V and the high level of the boosting pulse Φ1 as the voltage Vd, the voltage of the node N14 is dropped from the voltage 0V to the voltage −Vd in response to the boosting pulse Φ1.

According to the above-mentioned operations, the influence of the threshold value voltage of the transistor NMT15 on the lowering of voltage can be reduced to an extent that the influence can be ignored thus enabling the movement of the charge from the node N14 to the node N15.

Figure 10:
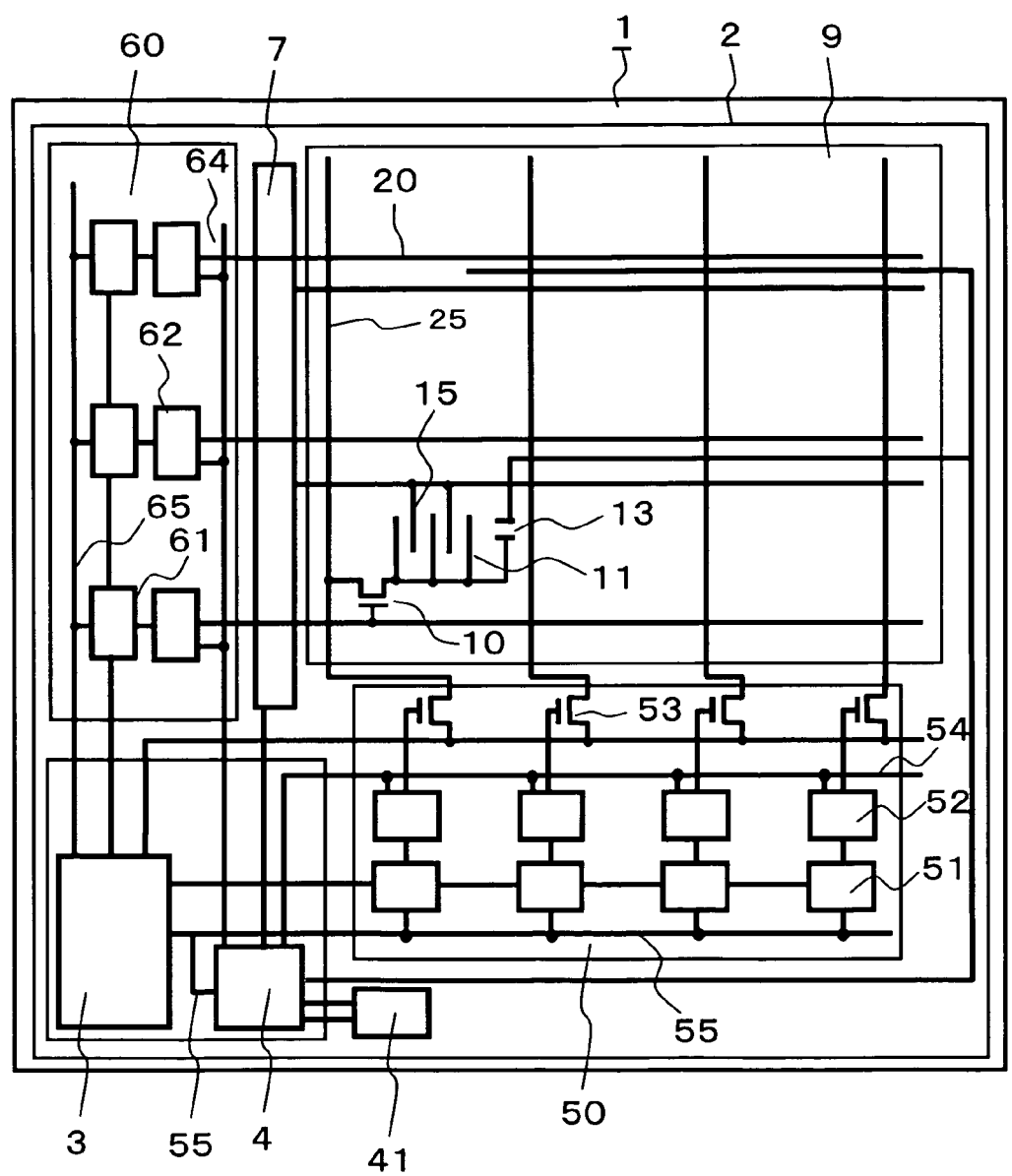
FIG. 10 is a schematic block diagram showing a liquid crystal display panel of the embodiment of the present invention.

Next, a driving circuit of a liquid crystal display panel 1 to which the booster circuit of the present invention is applied is explained in conjunction with FIG. 10. FIG. 10 is a block diagram showing the basic constitution of the liquid crystal display panel 1 of the embodiment of the present invention. As shown in the drawing, the liquid crystal display panel 1 includes an insulating substrate (element substrate) 2 made of a transparent glass, plastic or the like. Pixels 8 are arranged on the insulating substrate 2 in a matrix array thus forming a display region 9. Each pixel 8 includes a pixel electrode 11 and a switching element 10.

On a periphery of the display region 9, a video signal circuit 50, a scanning signal circuit 60 and the booster circuit 4 are formed along an end periphery of the insulating substrate 2. Since the video signal circuit 50, the scanning signal circuit 60 and the booster circuit 4 are formed by the same step for forming the switching elements 10 on the insulating substrate 2, the liquid crystal display panel can be formed in a compact shape compared to a semiconductor chip in which these circuits are formed in separate steps.

The video signal circuit 50, the scanning signal circuit 60, the booster circuit 4 and semiconductor layers which constitute the switching element 10 are formed of a poly-silicon film. The poly-silicon film has a larger crystalline particle size than the above-mentioned amorphous silicon film by supplying energy by laser irradiation or the like to an amorphous silicon film which is stacked on the insulating substrate 2 by a CDV method or the like thus re-crystallizing the amorphous silicon film.

The scanning signal lines 20 extend to the display region from the scanning signal circuit 60 and the scanning signal lines 20 are electrically connected to the control terminals of the switching elements 10. From the scanning signal circuit 60, the scanning signals which turn on or off the switching elements 10 are outputted to the scanning signal lines 20.

The scanning signal circuit 60 includes a shift register circuit 61 and pulse signals are outputted from the shift register circuit 61 such that the voltages which bring the switching elements 10 into an ON state are outputted to the scanning signal lines 20 during 1 horizontal period.

Although it is possible to drive the shift register circuit 61 with a high voltage which is obtained by elevating the voltage of the booster circuit 4, the shift register circuit 61 may be also driven with the low voltage. In this case, the pulse signal which is outputted from the shift register circuit 61 is converted into the pulse of high voltage by a level shifter circuit 62 and the pulse of high voltage may be outputted to the scanning signal line 20. In this case, a high-voltage power source line 64 is arranged and is electrically connected between the booster circuit 4 and the respective level shifter circuits 62. Here, a line 65 is a signal line which supplies a transmission clock to the shift register circuit 61.

A counter voltage supply circuit 7 is provided close to the scanning signal circuit 60. The counter voltage supply circuit 7 is provided for supplying the counter voltage to the counter electrode after dividing the counter voltage for respective counter voltage supply lines, wherein the counter voltage supply circuit 7 is effectively applicable to an IPS-method liquid crystal display device in which the counter electrode is separated for every pixel. The high-voltage power source line 74 is also arranged in the inside of the counter voltage supply circuit 7 and is electrically connected with the counter voltage supply circuit 7.

Video signal lines 25 extend to the display region 9 from the video signal circuit 50 and are connected with input terminals of the switching elements 10. video signals are outputted to the video signal lines 25 from the video signal circuit 50 and are written in the pixel electrodes 11 via the switching elements 10 which are turned on by the scanning signals.

The video signal circuit 50 includes the output gate circuit 53 and outputs the video signals supplied from the outside to the video signal lines 25 in accordance with timing pulses which are outputted from the shift-register circuit 51. When a voltage range of the video signal is wide such as a case in which the video signals are directly supplied from the outside of the liquid crystal display panel 1, there may be a case that the voltage which the shift register circuit 51 outputs is insufficient as a voltage to turn on the output gate circuit 53. Accordingly, using the level shifting circuit 52, the voltage which can sufficiently turn on the output gate circuit 53 within the voltage range of the video signal can be outputted. Accordingly, also in the video signal circuit 50, the high-voltage power source line 54 from the booster circuit 4 is arranged and is electrically connected.

In FIG. 10, the transmitting pulse of the shift register circuit 51 and the boosting pulse of the booster circuit 4 are used in combination, and the transmitting pulse line 55 is connected with the shift register circuit 51 and the booster circuit 4. Further, an electrode 41 for output capacitor is formed on the insulating substrate 2 by steps substantially equal to the steps for forming the switching elements 10.

The liquid crystal display panel 1 shown in FIG. 10 may be formed on the same substrate together with the scanning signal circuit 60, the video signal circuit 50 and the booster circuit 4 and hence, the number of externally mounting parts can be reduced thus realizing the space saving in mounting parts. Further, the reliability of connection of the respective parts can be also enhanced.

What is claimed is:
1. A display device comprising:
a first substrate;
a second substrate;
a plurality of pixel electrodes formed on the first substrate;
a switching element supplying a video signal to the pixel electrode;
a video signal line supplying a video signal to the switching element; and
a scanning signal line supplying a scanning signal which controls the switching element, wherein:
a first booster circuit and a second booster circuit are formed on the first substrate and connected serially,

13 the first booster circuit includes a first capacitor element and a first booster switching element connected to the first capacitor element, the second booster circuit includes a second capacitor element and a second booster switching element connecting between the first capacitor element and the second capacitor element, a first pulse is applied to the first capacitor element of the first booster circuit wherein said first pulse oscillates between a first voltage and a second voltage which is lower than the first voltage, a second pulse is applied to the second capacitor element of the second booster circuit, wherein said second pulse has a phase opposite to a phase of the first pulse, a third capacitor element is connected to a control terminal of the first booster switching element to receive a third pulse, wherein said third pulse oscillates between a third voltage and a fourth voltage which is lower than the third voltage, a voltage which is applied to a control terminal of the first booster switching element is boosted by a voltage output of the third capacitor element in response to the third pulse, and the switching element, the first booster circuit and the second booster circuit include a transistor formed on the first substrate, the display device further comprising:
 a first transistor in a diode connection which is provided between the first capacitor element and the third capacitor element; and
 a second transistor which is provided between the third capacitor element and the first capacitor element and which includes a control terminal connected to the second capacitor element,
 wherein, in a state that the fourth voltage is applied to the third capacitor element, the first voltage of the first pulse is applied to the first capacitor element to boost a voltage of a control terminal of the first transistor to a fifth voltage, and the boosted fifth voltage is supplied to a control terminal of the first booster switching element via the first transistor in a diode connection.

2. A display device according to claim 1, wherein the first pulse and second pulse are inverted with respect to each other.

3. A display device comprising:
a first substrate;
a second substrate;
a plurality of pixel electrodes which are formed on the first substrate;
a pixel switching element which supplies a video signal to the pixel electrode;
a video signal line which supplies a video signal to the pixel switching element;
a scanning signal line which supplies a scanning signal which controls the pixel switching element;
a first driving circuit which outputs the video signal;
a second driving circuit which outputs the scanning signal; and
a booster circuit, wherein:
the booster circuit includes a first capacitor element, a second capacitor element and a booster switching element which is provided between the first and second capacitor elements, wherein the first capacitor element is configured to be applied with a first pulse and the second capacitor element is configured to be applied with a second pulse, and

14 a third capacitor element is connected to a control terminal of the booster switching element to receive a third pulse,
the display device further comprising:
a first transistor in a diode connection which is provided between the first capacitor element and the third capacitor element; and
a second transistor which is provided between the third capacitor element and the first capacitor element and which includes a control terminal connected to the second capacitor element, wherein:
when the first pulse is applied to the first capacitor element, a voltage of a control terminal of the first transistor is boosted to a boosted voltage, the boosted voltage is supplied to a control terminal of the booster switching element via the first transistor in a diode connection, a voltage of the control terminal changes to the first control voltage due to a voltage reduction of the first transistor, and a voltage which is applied to a control terminal of the booster switching element is boosted from the first control voltage to second control voltage by the third pulse.

4. A display device according to claim 3, wherein the first pulse and second pulse are inverted with respect to each other.

5. A display device comprising:
a first substrate;
a second substrate;
a plurality of pixel electrodes which are formed on the first substrate;
a switching element which supplies a video signal to the pixel electrode;
a video signal line which supplies a video signal to the switching element;
a scanning signal line which supplies a scanning signal which controls the switching element;
a first driving circuit which outputs the video signal;
a second driving circuit which outputs the scanning signal; and
a booster circuit, wherein
the booster circuit includes:
a first capacitor element;
a second capacitor element;
a first transistor which is provided between the first capacitor element and the second capacitor element;
a third capacitor element which is connected to the control terminal of the first transistor;
a second transistor in a diode connection which is provided between the first capacitor element and the third capacitor element; and
a third transistor which is provided between the third capacitor element and the first capacitor element and has a control terminal thereof connected to the second capacitor element, wherein
a first boosting pulse which oscillates between a first voltage and a second voltage which is lower than the first voltage, wherein the first boosting pulse is applied to a first terminal of the first capacitor element, and a second terminal of the first capacitor element is connected to an input terminal of the first transistor and an input terminal of the second transistor,
a second boosting pulse which has a phase opposite to a phase of the first boosting pulse is applied to a third terminal of the second capacitor element, and a fourth terminal of the second capacitor element is connected to an output terminal of the first transistor and the control terminal of the third transistor,
a fifth terminal of the third capacitor element is connected to the control terminal of the first transistor, and a pulse signal, which oscillates between a third voltage and a fourth voltage which is lower than the third voltage, is supplied to a sixth terminal, in a state that the fourth voltage is applied to the sixth terminal of the third capacitor element, the first voltage of the first boosting pulse is applied to the first terminal of the first capacitor element thus boosting a voltage of the second terminal of the first capacitor element to a fifth voltage, the boosted fifth voltage is supplied to the fifth terminal of the third capacitor element via the second transistor in a diode connection, a sixth voltage which is obtained by subtracting a threshold value voltage of the second transistor from the boosted fifth voltage is held in the third capacitor element, a voltage of the sixth terminal of the third capacitor element is changed from the fourth voltage to the third voltage thus boosting the sixth voltage which is held by the third capacitor element to a seventh voltage which is higher than the fifth voltage by an amount corresponding to a threshold value voltage of the first transistor, the seventh voltage is applied to the control terminal of the first transistor, and the fifth voltage is transmitted from the first capacitor element to the fourth terminal of the second capacitor element via the first transistor, and after transmitting the fifth voltage to the second capacitor element, the voltage of the third terminal of the second capacitor element is changed from the second voltage to the first voltage thus bringing the third transistor into an ON state whereby a charge in the fifth terminal of the third capacitor element is discharged to the second terminal of the first capacitor element.

* * * * *